Patented Jan. 11, 1944

2,339,066

UNITED STATES PATENT OFFICE 2,339,066

PROCESS FOR THE MANUFACTURE OF BENZOIC ACID VINYL ESTER

Heinrich Fischer and Adolf Freytag, Ludwigshafen-on-the-Rhine, Germany, assignors, by mesne assignments, to General Aniline & Film Corporation, New York, N. Y., a corporation of Delaware No Drawing. Application July 9, 1940, Serial No. 344,609. In Germany June 28, 1939

10 Claims. (Cl. 260—476)

The present invention relates to a process for the manufacture of benzoic acid vinyl ester.

It is well known that benzoic acid vinyl ester is obtained by causing acetylene, under increased pressure, to act upon benzoic acid in the liquid phase in the presence of zinc or cadmium salts of organic acids. However, since benzoic acid vinyl ester tends readily to polymerize and is kept in the course of its preparation for some hours at elevated temperatures, i. e., at conditions favoring the polymerization, it is necessary to work in the presence of fairly large amounts of solvents or diluents in order to repress the polymerization. But even when working under most favorable conditions, the formation of a few per cent of polymerization products cannot be avoided. On the other hand, the separation of the benzoic acid vinyl ester from the diluents represents a further process step which again requires care in order to avoid polymerization.

We have now found that monomeric benzoic acid vinyl ester is obtained in an excellent yield by passing vaporized benzoic acid together with acetylene over a catalyst comprising basis compounds or salts of carbonic acid or organic acids of the metals of the 1st or 2nd group of the periodic table at temperatures of between 250° and 350° C. When conducting the said process under proper conditions, a pale benzoic acid vinyl ester which is practically free from benzoic acid is obtained in almost quantitative yield. The catalysts can be used for a long time without reactivation becoming necessary. Among suitable catalysts there may be mentioned alkali metal and alkaline earth metal hydroxides, zinc acetate, cadmium acetate, mercuric acetate or, sodium benzoate or sulphonic acid salts of the said metals. Especially good results are obtained with mixed catalysts from cadmium or zinc acetate with small amounts, say from 0.1 to 5 per cent., of free alkali metal hydroxide. Often additions of aluminum compounds have proved favorable. The catalysts may be used either in lump form or precipitated on carriers, as for example active charcoal or pumice stone. The process can be carried out at normal, slightly increased or reduced pressures.

The following examples serve to illustrate how the present invention may be carried out in practice, but the invention is not restricted to the said examples.

Example 1

In a stream of 3000 liters of acetylene gas and 100 liters of nitrogen per hour benzoic acid is evaporated in the amounts listed in the following table within the time stated. The whole is passed at 280° C. over 10 liters of a catalyst prepared by soaking pumice stone with a 15 per cent. aqueous solution of cadmium acetate and drying. The yields obtained are likewise set out below:

|  | Duration | Through-put of benzoic acid | Yield of vinyl ester |
|---|---|---|---|
|  | Hours | Grams | Grams |
| Further | 6 | 3,640 | 3,380 |
| Do | 3 | 1,250 | 1,170 |
| Do | 7 | 2,480 | 2,260 |
| Do | 7 | 3,800 | 3,310 |

The resulting vinyl ester is separated by condensation and the unconverted acetylene is recirculated in the process. The benzoic acid vinyl ester is colorless and free from polymerized constituents.

Example 2

Acetylene and benzoic acid are passed in the manner described in Example 1 over 10 liters of active charcoal impregnated with 5 per cent. of cadmium acetate. Within 25 hours 2110 grams of benzoic acid vinyl ester are obtained from 6740 grams of benzoic acid, while when using an active charcoal which besides 3 per cent of cadmium acetate still contains 0.5 per cent of potassium hydroxide 4950 grams of vinyl ester are obtained from 5100 grams of benzoic acid within the same time. A similar result is obtained when using zinc acetate instead of cadmium acetate. Mercury acetate, too, gives good yields of vinyl ester.

Example 3

500 parts of grains of pumice having a size of from 4 to 6 millimeters are added to an aqueous solution containing 58.75 grams of crystallized aluminum sulphate and 75 grams of cadmium acetate. After the addition of an aqueous solution containing 38.4 grams of sodium hydroxide, the water is evaporated from the mixture.

The 25.5 grams of benzoic acid vaporized in 160 liters of acetylene each per hour are passed at 260° C. over 0.4 liter of the above catalyst which is arranged in an iron tube. The reaction product is separated by cooling with water and then distilled. After 31.5 days 18,648 grams of benzoic acid vinyl ester and 242 grams of unchanged benzoic acid are thus obtained from 19,308 grams of benzoic acid.

What we claim is:

1. In the production of benzoic acid vinyl ester from benzoic acid and acetylene, the step which comprises passing vaporized benzoic acid together with aceylene at between 250 and 350° C. over a catalyst selected from the group consisting of basic compounds of the metals of the 1st and 2nd group of the periodic table and of salts of carbonic acid and of organic acids with the said metals.

2. In the process of claim 1, the step which comprises employing a catalyst as defined in claim 1 admixed with a small amount of an alkali hydroxide.

3. In the process of claim 1, the step which comprises employing a catalyst as defined in claim 1 admixed with an aluminum compound.

4. In the production of benzoic acid vinyl ester from benzoic acid and acetylene, the step which comprises passing vaporized benzoic acid together with acetylene at between 250 and 350° C. over a compound of a metal of the first to the second group of the periodic table with an organic acid.

5. The process as defined in claim 4 wherein the organic acid is acetic acid.

6. The process as defined in claim 4 wherein the catalyst contains a small addition of an alkali metal hydroxide.

7. The process as defined in claim 4 wherein the catalyst is cadmium acetate.

8. The process as defined in claim 4 wherein the catalyst is a mixture of cadmium aceate and aluminum sulfate.

9. The process as defined in claim 4 wherein the catalyst is zinc acetate.

10. In the production of benzoic acid vinyl ester from benzoic acid and acetylene, the step which comprises passing vaporized benzoic acid and acetylene at a temperature of 280° C. over a catalyst comprising pumice stone impregnated with cadmium acetate.

HEINRICH FISCHER.
ADOLF FREYTAG.